Feb. 28, 1956 A. F. DELLHEIM 2,736,058
EXTRUSION APPARATUS
Filed Jan. 6, 1955
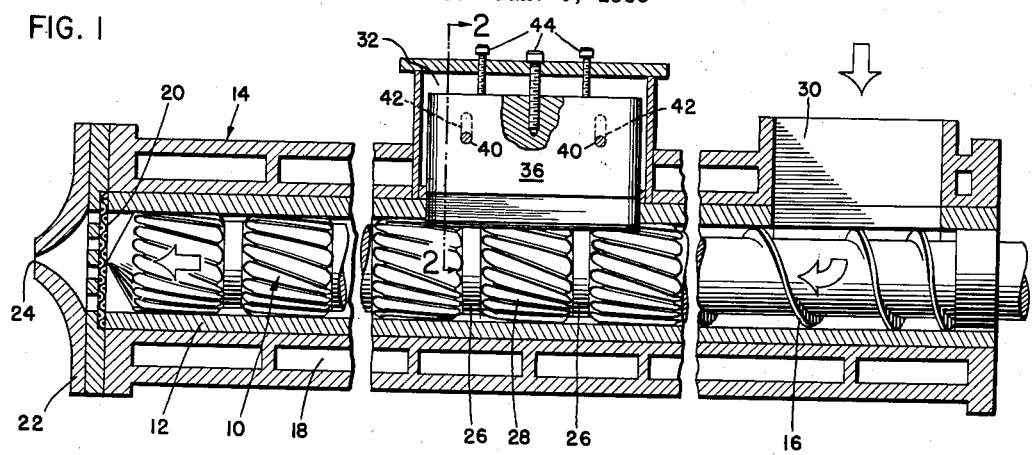
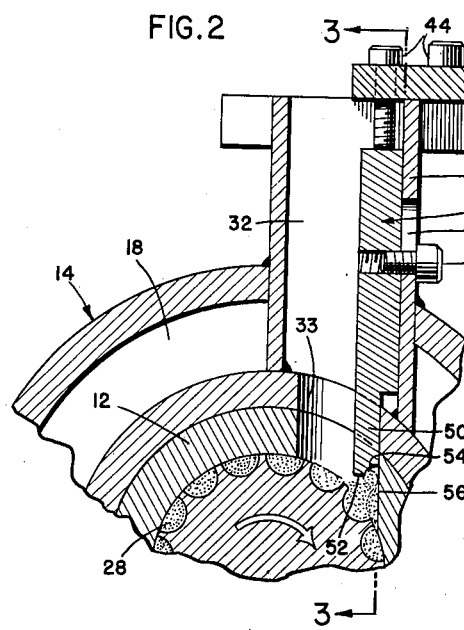
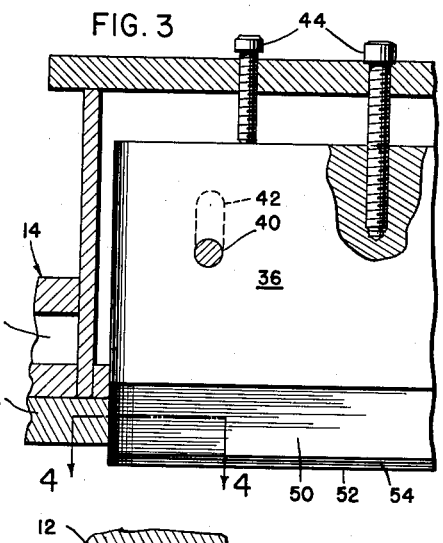
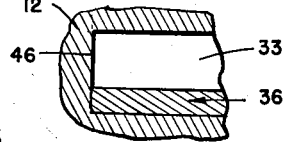
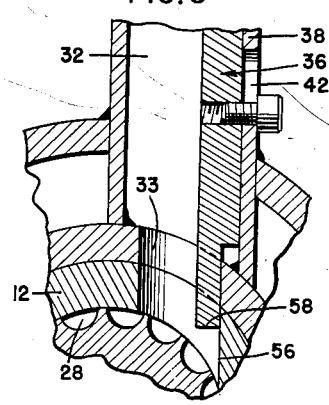
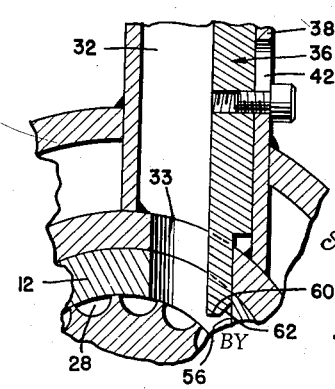
INVENTOR
Arthur F. Dellheim
BY Karl W. Flocks
ATTORNEY

United States Patent Office 2,736,058
Patented Feb. 28, 1956

2,736,058

EXTRUSION APPARATUS

Arthur F. Dellheim, Baltimore, Md., assignor to The National Plastic Products Company, Odenton, Md., a corporation of Maryland Application January 6, 1955, Serial No. 480,135

13 Claims. (Cl. 18—12)

This invention relates to the extrusion of materials and more particularly to the working of material by an extrusion type processing.

Various means have heretofore been used to blend organic thermoplastics with such modifiers as plasticizers, lubricants, pigments or dyes, and the like. This has often required the use of a plurality of machines such as dry mixers, compounding rolls, various types of kneaders or masticators, and other diverse machines. To overcome these costly, time-consuming processes, it has been suggested that the mixing and homogenizing of the material be conducted in the extrusion device itself. In such devices, the material is fed in at one end through a hopper and is conveyed by means of a screw conveyor and a mixing torpedo to the extrusion die. Although such equipment works well for certain materials, it has been found that in particular instances during the heating of the material, certain volatiles are given off and provision must be made for release of the volatiles given off. In the provision of a devolatilization chamber, additional problems have been encountered by the thermoplastic material in liquid form escaping through the devolatilization chamber along with the volatiles being released.

It is accordingly among the objects of the present invention to provide a means operable in conjunction with an extrusion device for preventing the rise of thermoplastic material into the devolatilization chamber.

A further object of the present invention is to provide a baffle means in the devolatilization chamber to prevent the flow of thermoplastic material through the devolatilization chamber.

A still further object of the present invention is to provide means in the devolatilization chamber for directing any thermoplastic material downwardly that attempts to rise in the devolatilization chamber.

Other objects and the nature and advantages of the instant invention will be apparent from the following description taken in conjunction with the accompanying drawings, wherein:

Fig. 1 is a longitudinal section through an extruder showing the feed worm, torpedo and devolatilization chamber block in elevation;

Fig. 2 is a partial cross sectional view taken along the line 2—2 of Fig. 1;

Fig. 3 is an enlarged view of a portion of Fig. 1;

Fig. 4 is an enlarged section taken along line 4—4 of Fig. 3;

Fig. 5 is a section similar to Fig. 2 of a modified form of the invention; and

Fig. 6 is a view similar to Fig. 5 showing a second modified form of the invention.

The objects listed above and others are accomplished by the following invention wherein a baffle which may be adjustable vertically is placed along one wall of the devolatilization chamber to divert any thermoplastic material that may tend to rise in the chamber during extrusion of the material.

A torpedo 10 is shown in the cylindrical barrel 12 of a horizontal extrusion machine 14 and its a coaxial extension of a shortened feed screw 16 of conventional type. The barrel 12 is surrounded by a chamber 18, for heating or cooling, as required. Beyond torpedo 10 in the extrusion path is a screen or strainer 20 held in place across the discharge end of barrel 12 by head 22 which is secured to the body of the extruder by suitable means, as bolts. Any desired type of extrusion orifice 24 may be used.

A plurality of circumferential necks 26 are provided at regularly spaced intervals along the torpedo. Disposed helically about the torpedo 10 is a series of rounded grooves 28 of a depth equal to the distance the necks 26 are set back from the surface of the barrel 12. The grooves 28 thus furnish continuous smooth passageways from one neck 26 to the next. The right helicoid grooves 28 are of opposite hand to the rotation of the screw 16 and torpedo 10.

Near the right end of the extruder 14 is a feed hopper 30 into which the material to be extruded is fed to the feed screw 16. Intermediate of the extruder 14 between the feed hopper 30 and the head 22 is a devolatilization chamber 32 located near the upper end of the extruder in communication with an opening 33 in the barrel 12. Through the opening 33 and chamber 32 are released the volatile gases. This chamber may be at atmospheric or any desired pressure or partial vacuum.

In operation, the extruder 14 is heated by steam in chamber 18 and the desired ingredients of the final mix are fed to screw 16 through hopper 30. The screw 16 and its coaxial extension, torpedo 10, are set in motion by a motor driven gear (not illustrated) in the conventional manner. Initial fusion and preliminary non-uniform mixing occurs as the feed is advanced by the screw toward the torpedo. When the feed reaches the torpedo, it is advanced through the grooves 28 among which it is evenly distributed. Continued rotation of the torpedo results in complete agitation of the mass. Apparently friction between the barrel 12 and the grooves 28 causes the plastic to roll within the groove, both axially of the grooves with the rotation and forwardly along the grooves. The mass in each groove becomes thoroughly mixed, and the material in the various grooves becomes mixed at each neck 26. The volatile gases are released through the devolatilization chamber 32. When the plastic streams are finally discharged beyond the torpedo head, the mass passes through the screen 20 and out through the orifice 24. Extrusion occurs substantially without pulsation.

Located within the devolatilization chamber 32 is a baffle or block 36 which extends virtually the entire length of the chamber. The block is bolted to the wall 38 of the devolatilization chamber by bolts 40 as best shown in Fig. 2. The wall 38 extends through the jacket 18. The wall 38 is provided with vertically elongated openings 42 extending therethrough, whereby the bolts extending through the openings 42 into the block 36 may be raised or lowered within the openings 42 to provide for vertical adjustment of the block within the chamber. The bolts 44 at the top of the block are likewise utilized for adjusting the height of the block within the chamber. The opening 33 of the devolatilization chamber 32 in the barrel 11 is preferably rectangular; however, it may be rounded at its ends if desired. The lower ends of the block 36 are shaped to fit the configuration of the chamber. As shown in Fig. 2, the block 36 is stepped downward near the lower end to a thickness 50 approximately half the thickness of the upper end of the block. The portion 50 of the block 36 bears against the opening in the barrel 12.

The lower surface of the block 36 may have several configurations, however, particularly good results have been obtained by the configuration shown in Fig. 2. This configuration includes a flat portion 52 and a curved portion 54, adjacent to the wall 56 of the barrel 12. As the torpedo rotates, the plastic material being carried across the opening 32 strikes the wall 56 of the barrel 12 and tends to move upwardly. This material comes in contact with the curved surface 54 and is directed downwardly back into the barrel 12.

Although the curved surface 54 on the block 36 adjacent to the wall 56 of the barrel 12 gives especially good results, the configurations shown in Figs. 5 and 6 also may be used.

The lower surface of the block 36 as shown in Fig. 5 is flat across the entire bottom surface, as shown at 58. The lower surface of the block 36 as shown in Fig. 6 is flat across a portion of the bottom as at 60 and slopes upwardly as shown at 62 toward the wall 56 of the barrel. Both of these configurations likewise tend to direct the plastic material downwardly and prevent passage of the material upwardly along with the volatiles.

The curved configuration as shown at 54 in Fig. 2 is particularly effective, since the plastic material tends to ball up in this curved chamber and drop back into the barrel 12.

For different plastic materials, the height of the lower surface of the block in the devolatilization chamber 32 must be changed, and the adjustable features shown permit a rapid adjustment as to height.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for feeding and treating plastic material including a feeding means operating within a barrel, which comprises an opening in the upper surface of said barrel, a devolatilization chamber connected to said opening, and a block extending into said opening extending substantially the entire length thereof and less than the width thereof, said block being located along the downstream wall of said opening.

2. Apparatus in accordance with claim 1 including means for adjusting the height of the lower surface of said block within said opening.

3. Apparatus in accordance with claim 2, wherein the portion of the lower surface of said block adjacent to the downstream wall of said opening is curved upwardly.

4. Apparatus in accordance with claim 1, wherein a portion of the lower surface of said block adjacent to the downstream wall of said opening is curved upwardly.

5. Apparatus in accordance with claim 1, wherein a portion of the lower surface of said block adjacent to the downstream wall of said opening slopes upwardly.

6. Apparatus in accordance with claim 5 including means for adjusting the height of the lower surface of said block within said opening.

7. Apparatus for extruding plastic materials, comprising a barrel, a feeding means operating within said barrel, a hopper at one end of said barrel, a die at the other end of said barrel, an opening in said barrel intermediate the ends thereof, a devolatilization chamber attached to said opening, and a baffle extending into said opening extending substantially the entire length thereof and less than the width thereof, said baffle being located along the downstream wall of said opening whereby the plastic material tending to rise in said opening will contact the lower surface of said baffle and be directed downwardly into said barrel.

8. Apparatus in accordance with claim 7, wherein means are provided for adjusting the height of the lower surface of said baffle within said opening.

9. Apparatus in accordance with claim 8, wherein the lower surface of said baffle adjacent to the downstream wall of the opening is curved upwardly.

10. Apparatus in accordance with claim 7, wherein the lower surface of said baffle adjacent to the downstream wall of the opening is curved upwardly.

11. Apparatus in accordance with claim 7, wherein a portion of the lower surface of said baffle adjacent to the downstream wall of said opening slopes upwardly.

12. Apparatus in accordance with claim 11 including means for adjusting the height of the lower surface of said block within said opening.

13. Apparatus for extruding plastic materials, comprising a barrel, a feeding means operating within said barrel, a hopper at one end of said barrel, a die at the other end of said barrel, an opening in said barrel intermediate the ends thereof, and a baffle extending into said opening extending substantially the entire length thereof and less than the width thereof, said baffle being located along the downstream wall of said opening whereby the plastic material tending to rise in said opening will contact the lower surface of said baffle and be directed downwardly into said barrel.

References Cited in the file of this patent

UNITED STATES PATENTS 2,615,199   Fuller ---------------- Oct. 28, 1952